United States Patent [19]
Rumreich

[11] Patent Number: 5,841,488
[45] Date of Patent: Nov. 24, 1998

[54] MULTIPLE VIDEO INPUT CLAMPING ARRANGEMENT

[75] Inventor: Mark Francis Rumreich, Indianapolis, Ind.

[73] Assignee: Thomson Consumer Electronics, Inc., Indianapolis, Ind.

[21] Appl. No.: 579,723

[22] Filed: Dec. 28, 1995

[51] Int. Cl.⁶ ............................. H04N 5/16; H04N 5/18
[52] U.S. Cl. ..................... 348/694; 348/695; 348/696; 348/598
[58] Field of Search .......................... 348/586, 584, 348/598, 691, 694, 695, 696, 565, 566; H04N 5/45, 5/16, 9/74, 5/18

[56] References Cited

U.S. PATENT DOCUMENTS

| | | | |
|---|---|---|---|
| 3,730,984 | 5/1973 | Smith | 348/189 |
| 3,927,255 | 12/1975 | Yorkanis | 178/7.3 |
| 4,197,557 | 4/1980 | Tuma et al. | 358/34 |
| 4,663,668 | 5/1987 | Rabii et al. | 348/694 |
| 4,837,625 | 6/1989 | Douziech et al. | 348/678 |
| 5,027,017 | 6/1991 | Fling | 307/555 |
| 5,079,623 | 1/1992 | Sendelweck et al. | 358/74 |
| 5,121,117 | 6/1992 | Rabii | 348/678 |
| 5,187,568 | 2/1993 | Srivastava | 358/39 |
| 5,251,015 | 10/1993 | Rumreich | 358/20 |
| 5,270,819 | 12/1993 | Watson | 358/172 |
| 5,325,187 | 6/1994 | Kubo et al. | 348/692 |
| 5,339,114 | 8/1994 | Lagoni et al. | 348/673 |
| 5,343,255 | 8/1994 | Lagoni | 348/678 |
| 5,371,552 | 12/1994 | Brummette et al. | 348/697 |
| 5,436,667 | 7/1995 | Lagoni et al. | 348/525 |
| 5,442,406 | 8/1995 | Altmanshofer et al. | 348/588 |
| 5,448,308 | 9/1995 | Walby et al. | 348/692 |

*Primary Examiner*—Sherrie Hsia
*Attorney, Agent, or Firm*—Joseph S. Tripoli; Peter M. Emanuel; Robert D. Shedd

[57] ABSTRACT

An apparatus having a selectable first mode of operation for clamping an input signal to a first reference level and a selectable second mode of operation for clamping a signal derived from the input signal to a second reference level.

13 Claims, 4 Drawing Sheets

MULTIPLE VIDEO INPUT CLAMPING ARRANGEMENT

FIELD OF THE INVENTION

This invention relates to video processing systems generally and particularly to video signal clamping circuits for use in video processing systems.

BACKGROUND OF THE INVENTION

Image information represented by a composite television signal is defined by a luminance component and additionally a chrominance component in the case of a color video signal. A brightness reference level is contained in a black level of the luminance component, and any variations in this DC level result in undesirable image brightness variations.

In a video signal processing system having multiple video input signals, changing the selected input video signal will result in undesirable image brightness variations (e.g., picture flashing) if the black level of the old and new input signals are different. In addition, in a video signal processing system, such as a television system, having the capability of displaying a secondary or auxiliary image as well as a main image, such as in a picture-in-picture (PIP) system, it is desirable that the brightness levels of the main and secondary images are approximately the same. Video processing systems capable of displaying main and secondary images may allow individual selection of a number of different video input signals for display as either the main or secondary image, making the balancing of image brightness even more difficult.

To prevent black level differences in a multiple input system it is known to clamp a reference level, such as the black levels or peaks of the synchronization pulses ("sync tips") of the synchronization intervals of all of the video input signals to a common reference level.

Signal processing errors may occur even though the video input signals are all clamped to a common reference signal. For example, if a synchronization signal separator including a level comparator ("sync slicer") is used to extract the synchronization components, offsets in the signal processing channel between the input selection switch and the sync separator will introduce errors. Such errors occur whether the signal processing channel is analog or digital.

Feedback from the output of the signal processing channel to the clamping circuit may be used to reduce clamping errors. An analog feedback clamp is described in U.S. Pat. No. 4,197,557 (Tuma et al.). A prior art digital feedback clamping circuit is shown in FIG. 2. This digital feedback clamp will clamp the DC level of an A/D converter output to a level determined by a digital comparator. In FIG. 2 the known prior art digital feedback clamping circuit comprises a coupling capacitor C coupled via a unity gain buffer amplifier 60 (symbolized by a "1" in the designator) to a six bit analog to digital converter (A/D 20) which provides a six bit digital luma output signal (Yout). A NOR gate 40 produces a high output at a reference level when bits 2, 3, 4 and 5 (the latter inverted by inverter 30) are zero. The output of NOR gate 40 is fed back via a feedback 50 includes buffer amplifier 51 and resistor 52 to control a switch 55. When switch 55 is open, a current source 54 removes current from capacitor C. When the digital output signal bits 5 (inverted by inverter 30), 4, 3 and 2 are zero, the switch 55 is closed thus supplying an additional current to capacitor C from a current source 53. As is known, the current provided by source 53 is greater than that of current sink 54 whereby current is supplied to charge capacitor C when the threshold of the digital comparator (formed by inverter 30 and NOR gate 40) is exceeded. As a result, the luma input signal Yin is clamped to a reference level determined by the digital comparator formed by inverter 30 and NOR gate 40.

Unfortunately, such known feedback clamping arrangements are only operative upon a single video input signal. Accordingly, in a multiple input video signal processing system, the unselected video input signals will not be clamped to the same DC level as the selected video input signal. As such, this circuit arrangement is susceptible to the undesirable image brightness variations during input reselection and during simultaneous display of main and PIP images, as previously described.

SUMMARY OF THE INVENTION

This invention concerns a video signal clamping apparatus having a first mode of operation for clamping an input signal to a first reference level, a second mode of operation for clamping a signal derived from the input signal to a second reference signal and a means for selecting the mode of operation.

Illustratively, the invention allows a video signal processing system having multiple video a video processing channel to selectively clamp a video input signal using a predetermined DC reference level or a DC reference level derived from the output signal of the signal processing channel. Accordingly, a selected video signal can be clamped to the DC reference level derived from the output of the signal processing channel and an unselected signal can be clamped to the predetermined DC reference level. Brightness variations are reduced because the selected and unselected video input signals are both clamped to DC reference levels.

BRIEF DESCRIPTION OF THE DRAWINGS

The invention will be described with reference to the accompanying Drawing, in which.

Like reference designators in the various Figures refer to the same or similar elements.

DETAILED DESCRIPTION

Figure 1:
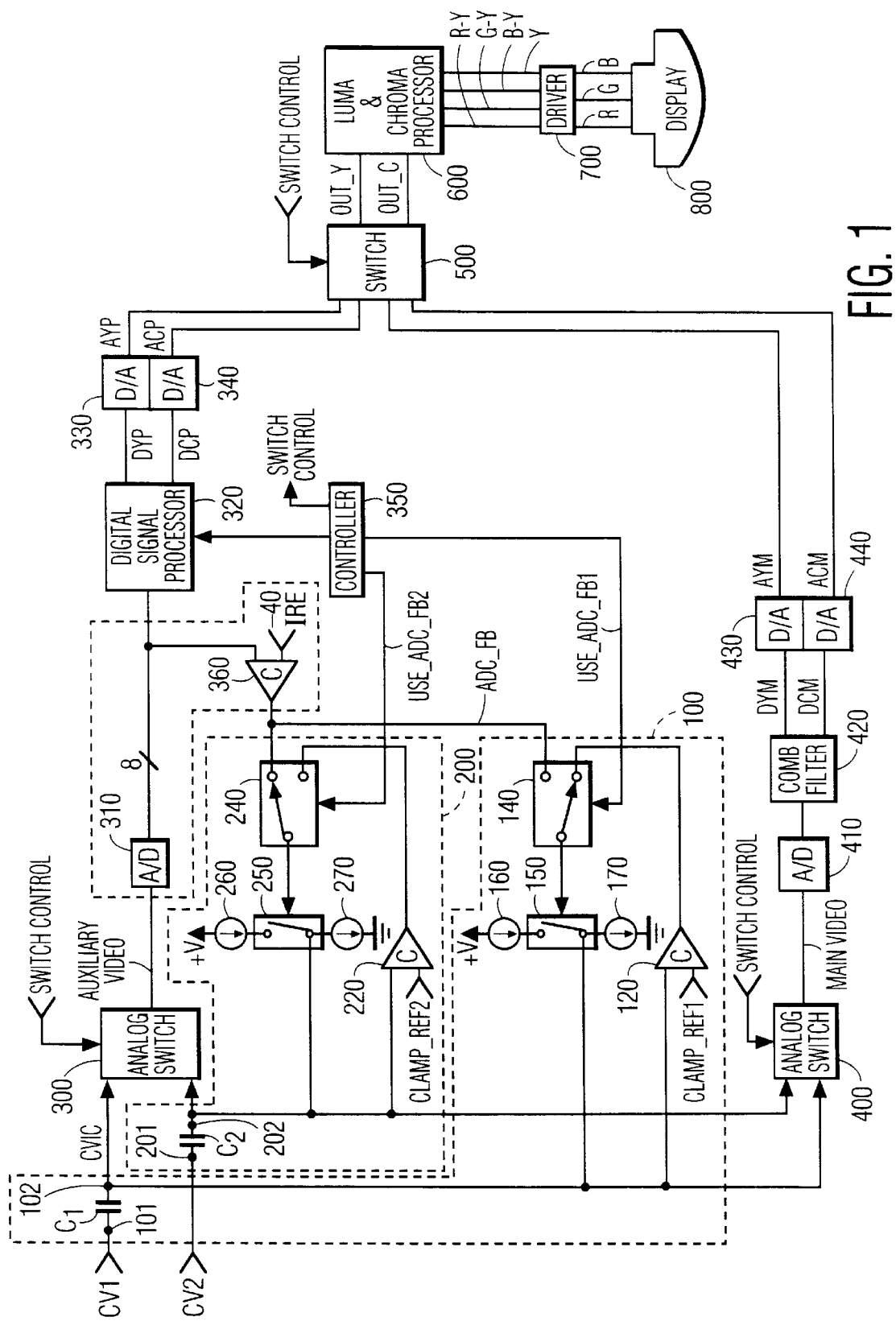
FIG. 1 shows a multiple video input television system including signal clamping apparatus embodying the invention.
Figure 2:
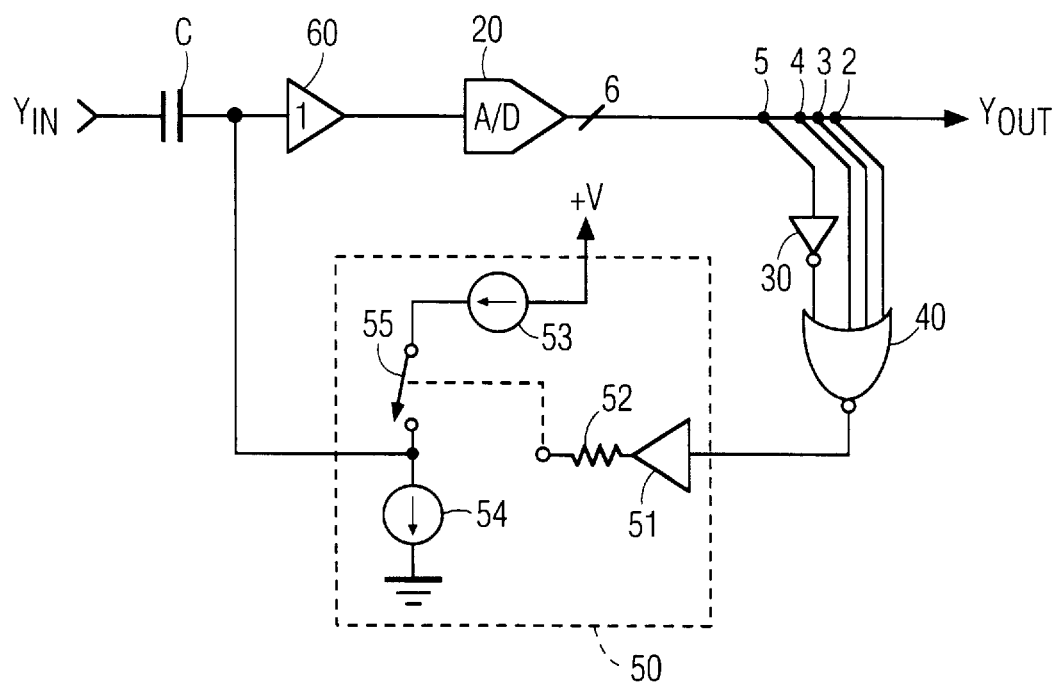
FIG. 2 shows a prior art signal clamping apparatus which is employed as part of an embodiment of the invention in accordance with another aspect of the invention.

Referring to FIG. 1, a video signal processing system, illustratively a television system, includes N video inputs, although only two, 101 and 201, of the N inputs are shown. First CV1 and second CV2 composite video input signals are coupled by respective capacitors C1 and C2 to switch 300 and to switch 400. Capacitors C1 and C2 include respective output nodes 102 and 202. The capacitor output nodes 102 and 202 are coupled to respective clamping circuits for controlling the DC levels of the signals present at the respective capacitor output nodes. Elements 100 and 200 comprise portions of clamping circuits for CV1 and CV2.

A portion of the clamping circuitry used to control the DC level for the CV2 input signal is shown as 200 in FIG. 1.

The television system of FIG. 1 includes a main picture processing channel and a picture-in-picture (PIP) processing channel. When a video input signal is selected for PIP processing, the selected video signal is clamped by the clamping arrangement to a DC reference level derived from the selected input signal after it has been processed by the PIP processing channel so as to reduce offsets due to the processing. However, even when a video input signal is not selected for processing by the PIP processing channel, the DC level of the unselected video signal is clamped to a DC reference level such that subsequent selection of the video signal will not result in undesirable image brightness variations.

The main processing channel includes a switch 400, responsive to a controller 350, for selectively coupling one of the N video input signals to an analog to digital converter 410. The A/D converter 410 converts the selected input video signal into an 8-bit data stream which is presented to a comb filter 420 for processing into separate digital luminance DYM and chrominance DCM data streams. The digital luminance DYM and chrominance DCM data streams are converted into respective analog luminance AYM and chrominance ACM signals by respective digital to analog converters 430 and 440. The main analog luminance AYM and chrominance ACM signals are then coupled to a first pair of input terminals of a switch 500.

The PIP processing channel includes a switch 300, responsive to a controller 350, for selectively coupling one of the N video input signals to an analog to digital converter 310. The A/D converter 310 converts the input video signal into an 8-bit data stream which is presented to a digital signal processor (DSP) 320 and a digital comparator 360. The DSP 320 is responsive to the controller 350 for processing the digital video data stream to produce a digital luminance data stream DYP and a digital chrominance data stream DCP representative of the secondary or small image. The DSP 320 reduces the size of the image represented by the secondary luminance and chrominance video signals by deleting pixels and lines of these components. The digital luminance DYP and chrominance DCP data streams are converted into respective analog luminance AYP and chrominance ACP signals by respective digital to analog converters 330 and 340. The PIP analog luminance AYP and chrominance ACP signals are then coupled to a second pair of input terminals of switch 500.

Switch 500, responsive to controller 350 operating in a "main" mode, couples only the main analog luminance AYM and chrominance ACM signals to a luminance and chrominance processor 600. The luminance signal is processed to control the contrast, sharpness and brightness properties of the picture. The chrominance signal is demodulated to produce red R-Y, green G-Y and blue B-Y color difference signals and processed to control the saturation and tint properties of the picture. The processed luminance signal Y and the color difference signals R-Y, G-Y, B-Y are coupled to an output amplifier and matrix or "driver" 700 which supplies high level red R, green G and blue B signals to a display device 800.

Switch 500, responsive to controller 350 operating in a "PIP" mode, additionally couples the PIP analog luminance AYP and chrominance ACP signals to luminance and chrominance processor 600 during a predetermined portion of the main image such that the video signal processed by the PIP processing channel is displayed as a small picture within the larger main picture by the display device 800.

Clamp 100 receives a reference signal CLAMP_REF1, a switch control signal ADC_FB and a selection signal USE_ ADC_FB1. Similarly, clamp 200 receives a reference signal CLAMP_REF2, a switch control signal which is the same as ADC_FB and a selection signal USE_ADC_FB2. The remainder of the description will refer primarily to clamp 100, since clamps 100 and 200 are similar.

The respective reference signals CLAMP_REF1 and CLAMP_REF2 are DC voltage levels. These voltage levels may be from different voltage sources or a common voltage source. The purpose of the respective reference signals CLAMP_REF1 and CLAMP_REF2 is to establish the clamping levels for respective video signals which are not selected for processing by PIP video processing channel.

The switch control signal ADC_FB is produced by the PIP video processing channel in the exemplary embodiment. This switch control signal is derived, e.g., by comparing the output of an A/D converter 310 to a digital word representing a DC signal reference level, e.g., corresponding to the sync tip level. The purpose of the switch control signal ADC_FB is to establish the clamping level for a video signal which is selected for processing by the PIP video processing channel.

The selection signal USE_ADC_FB is produced by controller 350. The construction of controller 350 is not critical to the invention; it may comprise a microprocessor or microcontroller circuit, a state machine, a combinational logic circuit or an analog control circuit. Controller 350 may also incorporate a user input, e.g., remote control input(s).

Clamps 100 and 200 have two modes of operation; a first (unselected) mode is used to clamp inputs which are not selected for processing by the PIP video processing channel and a second (selected) mode is used to clamp inputs which are selected for PIP processing. Unselected mode and selected mode are determined by, respectively, a logic low and logic high level of the USE_ADC_FB reference selection signal.

In the illustrated embodiment clamping circuit 100 is a sync tip clamp. The sync-tip clamp 100 includes coupling capacitor C1, comparator 120, switch 140, switch 150, current sources 160 and 170. Sync tip clamp 100 may also include an optional low pass filter (not shown), the purpose of which will be described after the basic operation of the sync tip clamp 100 is described.

The video signal to be clamped is applied to the input terminal 101 of a coupling capacitor C1. In the illustrative example, the horizontal synchronizing pulses are negative-going pulses and positive-going excursions of active video represent white areas of the images. The DC restored or clamped video output signal is provided at the output terminal 102 of the capacitor C1.

The video signal at output terminal 102 of capacitor C1 is coupled to an inverting input terminal of comparator 120. A reference potential CLAMP_REF1 is applied to a non-inverting input terminal of comparator 120. Comparator 120 generates a bilevel output signal which is relatively positive when the amplitude of the video signal is less than CLAMP_REF1 and relatively negative when the amplitude of the video signal is greater than CLAMP_REF1.

In the non-selected mode (USE_ADC_FB=0), the bilevel output of comparator 120 is coupled to switch 150 via switch 140. Switch 150 closes in response to a relatively positive level output from comparator 120. When switch 150 closes a constant current from current source 160 is coupled to terminal 102 of capacitor C1. The current begins to charge capacitor C1 such that DC voltage level of the signal at terminal 102 increases. As the DC level of the signal at terminal 102 increases, the DC level of the video signal applied to the inverting input of comparator 120 also increases. When the video signal at the inverting input of comparator 120 exceeds the CLAMP_REF signal at the non-inverting input of comparator 120, the bilevel output signal generated by comparator 120 will become relatively negative. This relatively negative level will cause switch 150 to open, thereby decoupling current source 160 from terminal 102. At this time current source 170 will begin to discharge capacitor C1 such that DC level of the video signal at terminal 102 decreases. Current source 170 is coupled to terminal 102 and sinks current (e.g., 1 mA) from the capacitor C1 tending to drive terminal 102 to a relatively negative potential. The current source 170 insures that the system does not lock up at an erroneous relatively positive DC value. The first control loop operates to clamp the DC level of the signal at terminal 102 to the DC level of the reference voltage CLAMP_REF1.

In selected mode (USE_ADC_FB=1), switch 140 couples the clamp control signal ADC_FB to switch 150. During the operation of the second control loop, the switch control signal ADC_FB is used to directly control switch 150 and comparator 120 is bypassed. Clamp control signal ADC_FB is derived by comparing the output of A/D converter 310 to a digital word representing a −40 IRE reference level. ADC_FB is also a bilevel signal which indicates whether or not the output level of A/D converter 310 exceeds the −40 IRE clamping level.

Assuming that the instantaneous video signal applied to comparator 360 contains amplitude levels below −40 IRE (representing the "blacker-than-black" level of the tip of a synchronizing pulse), the bilevel output ADC_FB of comparator 360 will be relatively positive. As such, switch 150 will close and a constant current (e.g., 25 uA) from current source 160 will begin to charge capacitor C1 such that DC voltage level of the signal at terminal 102 increases. As the DC level of the video signal at terminal 102 increases the video signal applied to the A/D converter 310 also increases and the A/D converter 310 responsively increases the DC level of the digital video output signal. When the instantaneous level video signal applied to comparator 360 does not fall below −40 IRE, the bilevel output ADC_FB of comparator 360 will become relatively negative. This relatively negative signal will cause switch 150 to open, thereby decoupling current source 160 from terminal 102. At this time current source 170 will begin to discharge capacitor C1 such that DC voltage level of the signal at terminal 102, and therefore the DC level of the video signal, decreases. This second control loop operates to clamp the minimum amplitude level of the video signal to the −40 IRE level.

The video signal from the output terminal 102 of capacitor C1 may be coupled to comparator 120 via an optional low pass filter (LPF). The LPF is used when the input video signal is a composite video signal containing both luminance and chrominance components. When used, the LPF may comprise, e.g., a series resistor and a shunt capacitor. The 3dB frequency rolloff point of the LPF should be selected to pass horizontal synchronizing pulses while attenuating noise and the higher frequency components of the active video signal including burst. In addition, the series resistor in the LPF should be sufficiently large to preclude loading of terminal 102.

Figure 4:
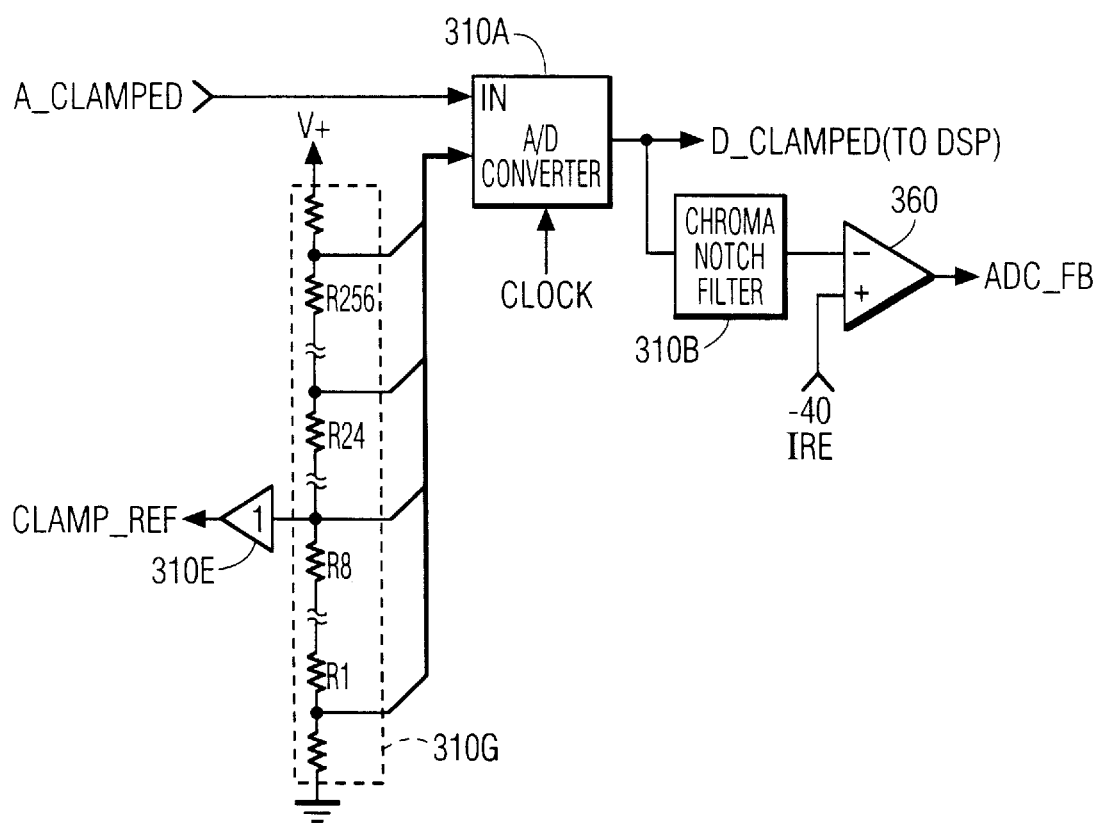
FIG. 4 shows an A/D converter circuit suitable for use with the television systems of FIGS. 1 and 3.

Referring to FIG. 4, A/D converter circuit 310 is depicted along with comparator 360. An analog video signal A_CLAMPED received from a clamping circuit (e.g., clamp 100 via switch 300) is coupled to an A/D converter 310A. The A/D converter 310A converts the analog video signal A_CLAMPED into a digital video signal D_CLAMPED comprising a series of digital words corresponding to respective samples of the analog video signal A_CLAMPED at a sampling rate determined by the frequency of a clocking signal CLOCK. In the exemplary embodiment an 8-bit A/D converter is used. The digital signal D_CLAMPED is coupled to a digital signal processor 320 (shown in FIG. 1).

Clamp control signal ADC_FB is derived by coupling the digital video signal D_CLAMPED to comparator 360. A chrominance notch filter 310B may be inserted between A/D converter 310A and comparator 360 for the reasons discussed below. Chrominance notch filter 310B may be used to strip away chrominance components when the digital video signal D_CLAMPED contains both luminance and chrominance components. Comparator 360 compares the digital video signal D_CLAMPED to a signal representative of the −40 IRE level, as previously described. It will be appreciated by those skilled in the art that optional chrominance notch 310B and comparator 360 described above may be implemented by a variety of circuits, e.g., discrete logic, state machines, digital signal processors (DSPs), etc.

The A/D converter circuit 310 includes a resistor ladder network 310G comprising a number of series-connected resistors, although the only resistors shown are top (V+ connected), bottom (ground connected), R1, R8, R24 and R256 resistors. The upper and lower conversion range of A/D converter 310A is set by the voltage reference taps at the top and bottom resistors. The remaining resistors determine the discrete reference voltage steps used by A/D converter 310A to convert the analog video signal A_CLAMPED into the digital video signal D_CLAMPED.

The signal CLAMP_REF is derived from the voltage level at ladder resistor R8 via a buffer amplifier 310D. This voltage corresponds to the appropriate reference level for the sync tip of the video signal A_CLAMPED. The CLAMP_REF signal may be provided to each of the clamp circuits to replace the reference signals CLAMP_REF1, CLAMP_REF2 . . . CLAMP_REFN. By using CLAMP_REF as the unselected mode reference level, the unselected input video signals CV1 and CV2 through CVN are clamped to a brightness level directly related to the operating range of A/D converter 310A. As such, when an unselected video input is selected for video processing, there will be little (if any) undesirable image brightness variations.

When an input video signal is not selected for processing, the inventive clamping arrangement clamps the unselected video signal to a DC voltage level. When the unselected video input is subsequently selected for processing, the inventive clamping arrangement will be able to change from unselected to selected mode while keeping the clamped video signal within the DC level limits of the PIP processing channel. The transitional response is fairly rapid because the unselected video signal was previously clamped to a DC level approximating the level required for the selected video signal. As previously discussed, this approximation may be improved by using an inactive mode clamping level derived from the ladder network of the A/D converter in the selected channel.

Figure 3:
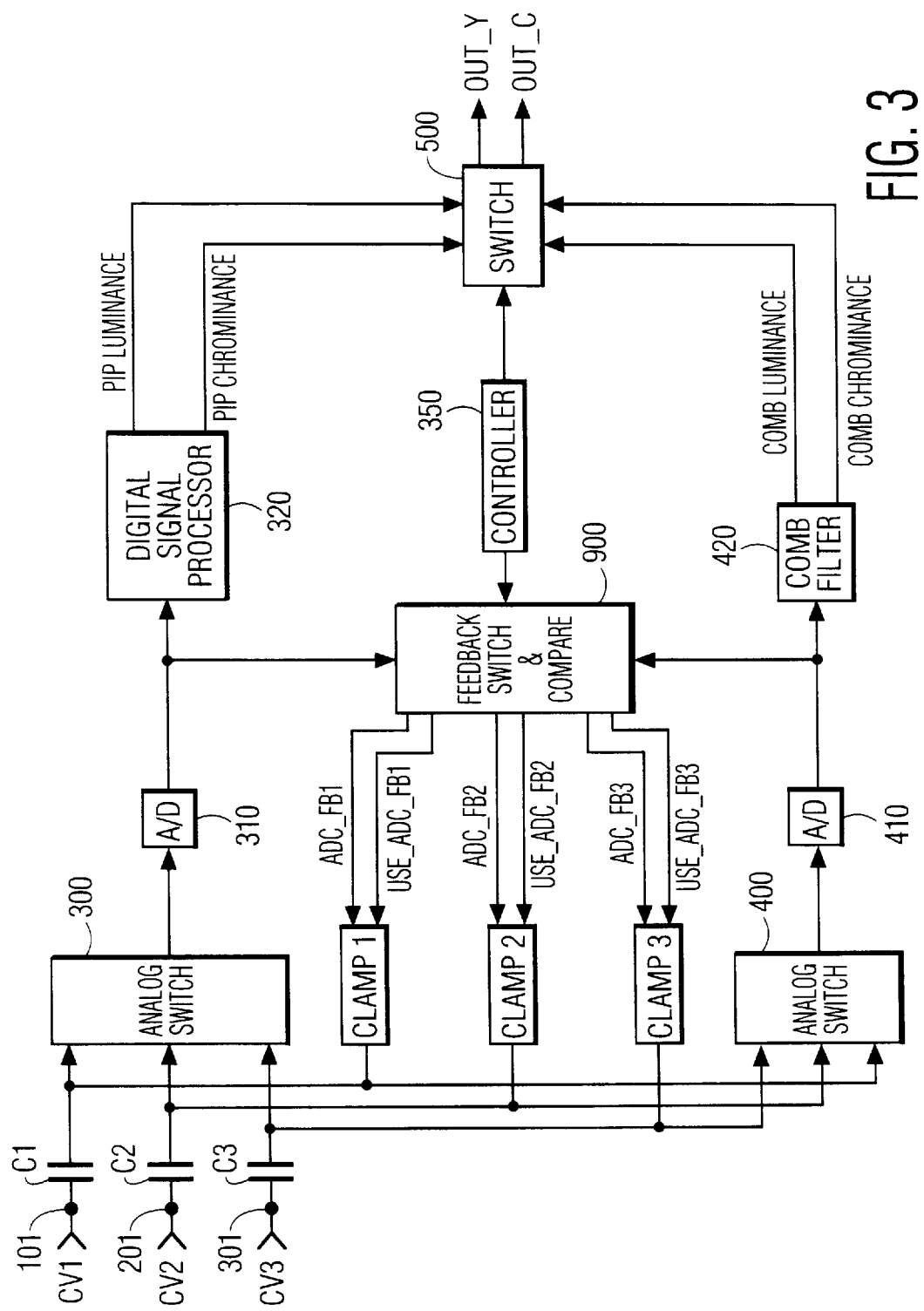
FIG. 3 shows a multiple video input television system including signal clamping apparatus embodying the invention.

Referring to FIG. 3, a video signal processing system similar to the system of FIG. 1 is shown. The television system of FIG. 3 includes N video inputs, although only three, 101, 201 and 301, of the N inputs are shown. First composite video input signal CV1 is clamped by CLAMP1, which includes capacitor C1 and (not shown) comparator 120, switch 140, switch 150, and current sources 160 and 170. Second composite video input signal CV2 is clamped by CLAMP2, which includes capacitor C2. Third composite video input signal CV3 is clamped by CLAMP3, which includes capacitor C3. Unlike the video signal processing system of FIG. 1, the system of FIG. 3 provides for switch selectable feedback to the clamp circuits from either the main A/D converter circuit 410 or the PIP A/D converter circuit 310.

The output signals of the two A/D converter circuits 310 and 410 are coupled to a feedback switch and comparator circuit 900 which is responsive to controller 350. The feedback switch and comparator circuit 900 includes a first comparator for comparing the output of the main A/D converter to a digital word representing −40 IRE and a second comparator for comparing the output of the PIP A/D converter to a digital word representing −40 IRE. Each of the comparator circuits operate in the manner previously described with respect to comparator 360 and each comparator produces a respective output signal. The feedback switch and comparator circuit 900 also includes a switching network which controllably couples the output of either comparator to any of the three clamp circuits CLAMP1–CLAMP3 as clamping switch control signals ADC_FB1, ADC_FB2 or ADC_FB3 respectively. In addition, feedback switch and comparator network 900 provides the three respective clamp selection signals USE_ADC_FB1, USE_ADC_FB2 and USE_ADC_FB3 in response to controller 350.

The video signal processing system of FIG. 3 allows clamping of the main and PIP input video signals to levels determined by the respective main and PIP analog to digital converter circuits.

The invention has been described in terms of conventional video signals including horizontal synchronizing components, however, it should be appreciated that it is applicable to any signals having, e.g., pulsed intervals, the amplitude of which bears some relationship to the DC reference value of the signal.

It will be apparent to those skilled in the art, that although the invention has been described in terms of specific examples, modifications and changes may be made to the disclosed embodiments without departing from the essence of the invention. For example, although the invention has been described in terms of certain types of video signals such as composite video signals, it is also applicable when other types of video signals, such as component video signals, are processed. In addition, although the invention has been described with reference to an embodiment in which a digital processing channel is utilized, it is also applicable when an analog signal processing channel is utilized. It is, therefore, to be understood, that the appended claims are intended to cover all modifications which naturally flow from the foregoing description and examples.

We claim:

1. Apparatus comprising:

comparison means including an analog comparator means for comparing a first signal to a first reference level and a digital comparator means for comparing a second signal to a second reference level, said first signal being an analog signal, said second signal being a digital signal derived from said first signal;

adjusting means responsive to said analog comparator means for adjusting said first signal such that during a first mode of operation said first signal is clamped to said first reference level, said adjusting means being responsive to said digital comparator means during a second mode of operation such that said second signal is clamped to said second reference level; and means for selecting between said first mode of operation and said second mode of operation for said adjusting means.

2. The apparatus of claim 1 further comprising analog to digital converter means for deriving said second signal from said first signal.

3. The apparatus of claim 1 wherein said first signal is a composite video signal.

4. The apparatus of claim 2 wherein said first signal is a composite video signal.

5. The apparatus of claim 4 wherein said first reference level represents the nominal level of the most negative excursion of said first signal and said second reference level represents the nominal level of the most negative excursion of said second signal.

6. Apparatus comprising:

means for comparing a first signal to a first reference level and for comparing a second signal to a second reference level, said second signal being derived from said first signal;

means responsive to said comparing means for adjusting said first signal such that during a first mode of operation said first signal is clamped to said first reference level and during a second mode of operation said second signal is clamped to said second reference level;

means for selecting one of said first and second modes of operation;

analog to digital converter means for deriving said second signal from said first signal;

wherein said first signal is a composite video signal;

wherein said first reference level represents the nominal level of the most negative excursion of said first signal and said second reference level represents the nominal level of the most negative excursion of said second signal; and wherein:

said comparing means includes an analog comparator for comparing said first signal to said first reference level and a digital comparator for comparing said second signal to said second reference level; and said comparing means couples an output of said analog comparator to said adjusting means in said first mode of operation and couples an output of said digital comparator to said adjusting means in said second mode of operation.

7. The apparatus of claim 6 wherein said adjusting means comprises:

charging means for increasing a DC level of said first signal responsive to a first output level from said comparing means; and discharging means for decreasing said DC level of said first signal responsive to a second output level from said comparing means.

8. Method comprising the steps of:

selecting a first or a second mode of operation;

providing an analog comparison of a first signal to a first reference level in said first mode of operation;

deriving a second signal from said first signal;

providing a digital comparison of said second signal to a second reference level in said second mode of operation; and responsively adjusting said first signal such that said first signal is clamped to said first reference level in said first mode of operation responsive to said analog comparison and said second signal is clamped to said second reference level in said second mode of operation responsive to said digital comparison.

9. Apparatus comprising:

analog comparator means for comparing a first signal to a first reference level;

digital comparator means for comparing a second signal to a second reference level, said second signal being derived from said first signal;

adjusting means responsive to said analog and digital comparator means for adjusting said first signal such that during a first mode of operation said first signal is clamped to said first reference level and during a second mode of operation said second signal is clamped to said second reference level; and means for selecting one of said first and second modes of operation.

10. The apparatus of claim 9 further comprising analog to digital converter means for deriving said second signal from said first signal.

11. The apparatus of claim 9 wherein said first signal is a composite video signal.

12. The apparatus of claim 9 wherein said first signal is a composite video signal.

13. The apparatus of claim 12 wherein said first reference level represents the nominal level of the most negative excursion of said first signal and said second reference level represents the nominal level of the most negative excursion of said second signal.

* * * * *

UNITED STATES PATENT AND TRADEMARK OFFICE
CERTIFICATE OF CORRECTION

PATENT NO. : 5,841,488
DATED : November 24, 1998
INVENTOR(S) : Mark Francis Rumreich It is certified that error appears in the above-identified patent and that said Letters Patent is hereby corrected as shown below: On the title page, item [56]:

References cited on INFORMATION DISCLOSURE STATEMENT UNDER 37 CFR 1.97 of August 3, 1998 NOT printed on face of patent dispite having been considered by the Examiner.

| | | | | | |
|---|---|---|---|---|---|
| AA | 5,329,312 | 7/12/94 | Boisvert et al. | 348 | 256 |
| AC | 4,965,669 | 10/23/90 | Canfield et al. | 358 | 171 |
| AM | 0535742 | 4/7/93 | EPO | H04N | 5/18 |
| AN | 0462804 | 12/27/91 | EPO | H04N | 5/18 |

AR    IEEE trans. on Consumer Electronics August 1991 entitled, PIX-IN-PIX IC WITH DIGITAL DECODING/ENCODING USING ONLY ONE CLOCK by Mark Rumreich, TCE, Indianapolis, Indiana Signed and Sealed this Sixth Day of March, 2001

*Attest:*

NICHOLAS P. GODICI

*Attesting Officer*     *Acting Director of the United States Patent and Trademark Office*